United States Patent
Davidsson

(10) Patent No.: US 10,623,093 B2
(45) Date of Patent: Apr. 14, 2020

(54) UTILITY COMMUNICATIONS USING OPTICAL FIBERS

(71) Applicant: ABB Schweiz AG, Baden (CH)

(72) Inventor: Mikael Davidsson, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/317,407

(22) PCT Filed: Jul. 13, 2016

(86) PCT No.: PCT/EP2016/066607
§ 371 (c)(1),
(2) Date: Jan. 11, 2019

(87) PCT Pub. No.: WO2018/010779
PCT Pub. Date: Jan. 18, 2018

(65) Prior Publication Data
US 2019/0326985 A1    Oct. 24, 2019

(51) Int. Cl.
*H04B 10/077* (2013.01)
*H04B 10/00* (2013.01)
*H04B 10/564* (2013.01)

(52) U.S. Cl.
CPC ......... *H04B 10/0779* (2013.01); *H04B 10/12* (2013.01); *H04B 10/564* (2013.01); *H04B 2210/074* (2013.01)

(58) Field of Classification Search
CPC ..... H04B 10/077; H04B 10/564; H04B 10/12
See application file for complete search history.

(56) References Cited

U.S. PATENT DOCUMENTS 5,383,046 A * 1/1995 Tomofuji ........... H04B 10/0777
                                                    398/181
5,448,629 A * 9/1995 Bosch ................. H01S 5/06835
                                                    372/29.014

(Continued)

FOREIGN PATENT DOCUMENTS

EP    0963065 A2    12/1999
EP    2348660 A1    7/2011

(Continued)

OTHER PUBLICATIONS

Written Opinion of the International Preliminary Examination Authority Application No. PCT/EP2016/066607 Completed: Jun. 22, 2018 6 Pages.

(Continued)

*Primary Examiner* — Dzung D Tran
(74) *Attorney, Agent, or Firm* — Whitmyer IP Group LLC

(57) ABSTRACT

There is provided mechanisms for utility communications. A method is performed by a transmitter. The method includes superimposing a control and protection signal for utility communications on top of an existing optical signal transmitted over an optical fiber to form a composite signal, wherein the control and protection signal has lower bit rate than the existing optical signal. The method includes obtaining feedback by draining a portion of the composite signal from the optical fiber. The method includes adjusting amplitude of the control and protection signal according to the portion of the composite signal.

17 Claims, 7 Drawing Sheets

(56) References Cited

U.S. PATENT DOCUMENTS

| | | | | |
|---|---|---|---|---|
| 6,271,959 B1* | 8/2001 | Kim | ........................ | H04B 10/67 |
| | | | | 356/477 |
| 7,209,660 B1* | 4/2007 | Yee | ........................ | H04B 10/50 |
| | | | | 398/141 |
| 2011/0233379 A1* | 9/2011 | Sekiguchi | ............... | H01S 5/026 |
| | | | | 250/201.9 |
| 2015/0365317 A1* | 12/2015 | Wang | ..................... | G02B 6/268 |
| | | | | 398/16 |
| 2017/0359127 A1* | 12/2017 | Moeller | ............... | H04B 10/532 |

FOREIGN PATENT DOCUMENTS

| | | |
|---|---|---|
| EP | 2680464 A1 | 1/2014 |
| WO | 2008113141 A1 | 9/2008 |

OTHER PUBLICATIONS

Witten Opinion of the International Preliminary Examining Authority Application No. PCT/EP2016/066607 Completed: Oct. 2, 2018 7 Pages.
International Preliminary Report on Patentability Application No. PCT/EP2016/066607 Completed: Nov. 15, 2018 10 Pages.
International Search Report and Written Opinion of the International Searching Authority Application No. PCT/EP2016/066607 Completed: Mar. 29, 2017; dated Apr. 8, 2017 15 Pages.

* cited by examiner

UTILITY COMMUNICATIONS USING OPTICAL FIBERS

TECHNICAL FIELD

Embodiments presented herein relate to utility communications, and particularly to a method, a transmitter, a computer program, and a computer program product for utility communications.

BACKGROUND

Without an efficient communications network, modern power systems would not work. The communications network carries many of the vital signals that must be instantly exchanged, i.e., in real time, between different locations in the power systems to ensure the optimum control and protection of the power system. In short, communications networks enable power utilities keep electricity flowing, all the way from generators to the consumers.

Communications network conveys information for the remote control of unmanned stations, the transfer of data and load values from locations across the power grid to control centers, and transmits centralized or distributed control commands to the various sites. Communications relating to remote control of unmanned stations and transfer of data and load values is referred to as utility communications. Further, human operators communicate with each other using the communications network to coordinate actions and exchange all kinds of information. Communications between human operators is referred to as telecommunications.

Reliable communications enable protection systems to clear a line fault in the shortest possible time, or to isolate primary plant components directly affected by a fault, and thereby maintain the availability of all other critical assets in the grid.

However, there is still a need for efficient utility communications.

SUMMARY

An object of embodiments herein is to provide efficient utility communications.

According to a first aspect, there is presented a method for utility communications. The method is performed by a transmitter. The method comprises superimposing a control and protection signal for utility communications on top of an existing optical signal transmitted over an optical fiber to form a composite signal, wherein the control and protection signal has lower bit rate than the existing optical signal. The method comprises obtaining feedback by draining a portion of the composite signal from the optical fiber. The method comprises adjusting amplitude of the control and protection signal according to said portion of the composite signal.

Advantageously this method provides efficient utility communications.

Advantageously this method enables existing optical fibers for high-speed signals be used also for control and protection services, or vice versa.

According to a second aspect, there is presented a transmitter for utility communications, the transmitter comprising processing circuitry. The processing circuitry is configured to cause the transmitter to superimpose a control and protection signal for utility communications on top of an existing optical signal transmitted over an optical fiber to form a composite signal, wherein the control and protection signal has lower bit rate than the existing optical signal. The processing circuitry is configured to cause the transmitter to obtain feedback by draining a portion of the composite signal from the optical fiber. The processing circuitry is configured to cause the transmitter to adjust amplitude of the control and protection signal according to said portion of the composite signal.

According to a third aspect, there is presented a transmitter for utility communications. The transmitter comprises a superimpose module configured to superimpose a control and protection signal for utility communications on top of an existing optical signal transmitted over an optical fiber to form a composite signal, wherein the control and protection signal has lower bit rate than the existing optical signal. The transmitter comprises an obtain module configured to obtain feedback by draining a portion of the composite signal from the optical fiber. The transmitter comprises an adjust module configured to adjust amplitude of the control and protection signal according to said portion of the composite signal.

According to a fourth aspect, there is presented a computer program for utility communications, the computer program comprising computer program code which, when run on a transmitter, causes the transmitter to perform a method according to the first aspect.

According to a fifth aspect, there is presented a computer program product comprising a computer program according to the fourth aspect and a computer readable storage medium on which the computer program is stored. According to some aspects the computer readable storage medium is a non-volatile computer readable storage medium.

It is to be noted that any feature of the first, second, third, fourth, and fifth aspects may be applied to any other aspect, wherever appropriate. Likewise, any advantage of the first aspect may equally apply to the second, third, fourth, and/or fifth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
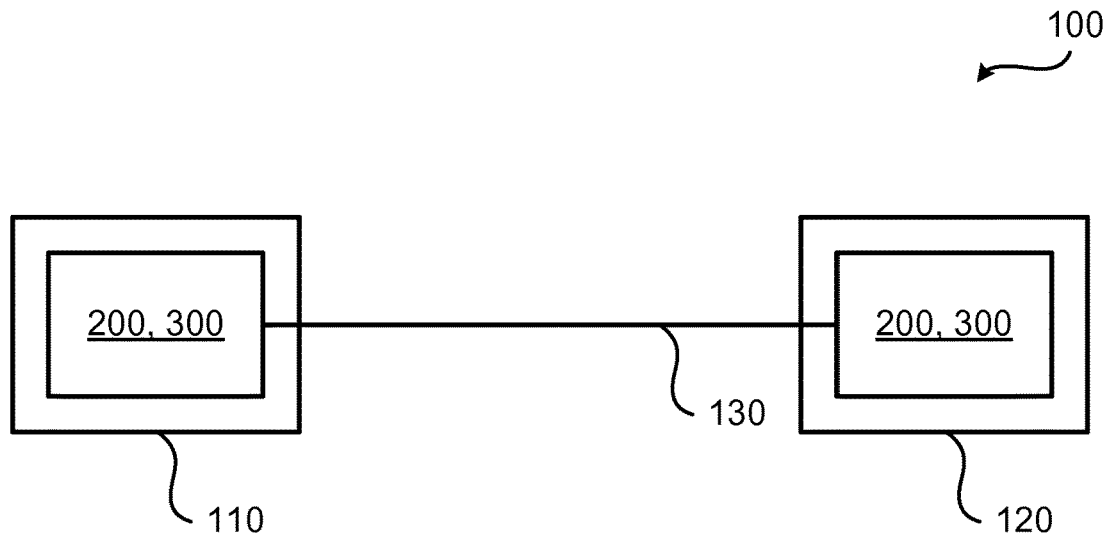
FIGS. 1 and 6 schematically illustrate a communications network for utility communications according to embodiments.

FIG. 1 schematically illustrates a communications network 100 for utility communications. The communications network 100 comprises two stations 110, 120 operatively connected by an optical fiber 130. Each station 110, 120 comprises a transmitter 200 and a receiver 300 for transmitting and receiving signals over the optical fiber 130.

Utility communications today typically use dedicated optical links for transmission of low-speed (typically in the order of 2 Megabits per second, Mb/s) control and protection services between the stations 110, 120. Today there are also additional optical fibers for standard high-speed (typically in the order of 10 Gigabits per second, Gb/s) telecommunications applications between the stations.

It could be advantageous to reduce the number of optical fibers by using the existing optical fiber for high-speed communication also for the control and protection service, hence using a single optical fiber connection.

One method to simultaneously transmit different signals on a common optical fiber 130 is to use wavelength division multiplexing (WDM), where each signal has a unique wavelength. However, for utility communications, the wavelength of the existing high-speed link is usually unknown. This means that the low-speed data for utility communications must be amplitude modulated onto the high-speed data for telecommunications applications.

Further, it could be cumbersome to extract the data from the existing high-speed link in the receiving station since the high-speed receiver could easily saturate if the low-speed signal amplitude is too high. Conversely it is today difficult to extract the superimposed low-speed signal in the receiver end if the amplitude is too low.

The embodiments disclosed herein relate to utility communications using optical fibers. In order to obtain this, there is provided a transmitter 200, a method performed by the transmitter 200, a computer program product comprising code, for example in the form of a computer program, that when run on the transmitter, causes the transmitter to perform the method.

Figure 2:
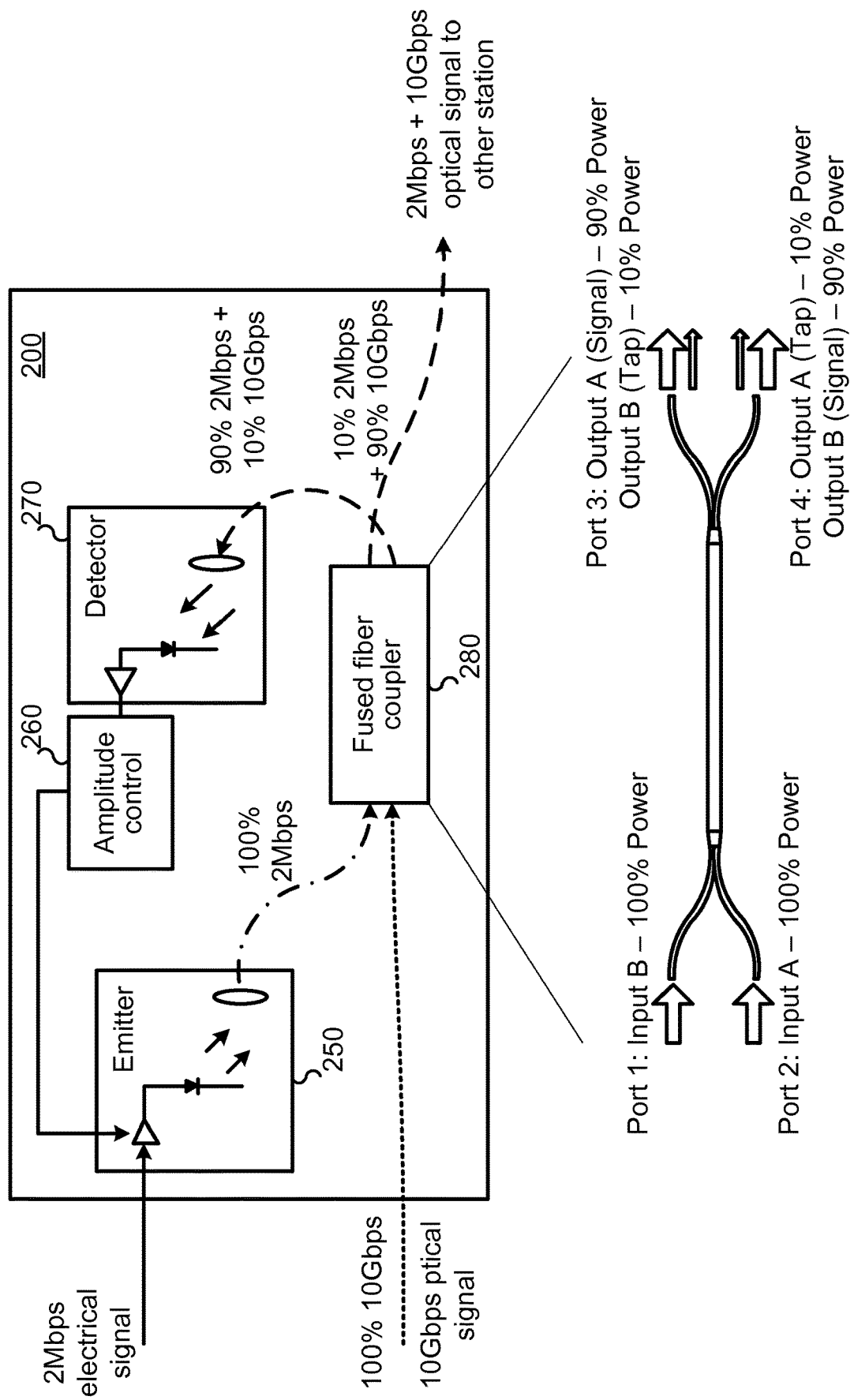
FIG. 2 schematically illustrates the transmitter part of a station according to an embodiment.

Reference is now made to FIG. 2. FIG. 2 schematically illustrates the transmitter 200 of the communications network 100 for utility communications. FIG. 2 schematically illustrates how a control and protection signal for utility communications can be superimposed on top of an existing optical signal. In the example of FIG. 2 the control and protection signal is a 2 Mbps electrical signal and the existing optical signal is a 10 Gbps optical signal. The transmitter 200 comprises an emitter 250 arranged to convert the electrical control and protection signal to an optical control and protection signal. The transmitter 200 comprises a fused fiber coupler 280 arranged to superimpose the optical control and protection signal on the existing optical signal to form a composite optical signal to be transmitted to another station. The fused coupler 280 generally comprises two, parallel, optical fibers that have been twisted, stretched, and fused together so that their cores are very close to each other. This forms a coupling region where light from one fiber is coupled over to the other. There are variants of fused fiber couplers with e.g. different coupling ratios. The fused fiber coupler 280 comprises four ports, denoted Port 1, Port 2, Port 3, and Port 4. In this example Port 1 and Port 2 are input ports, and Port 3 and Port 4 are output ports. One of the output ports are used to drain a portion of the transmitted composite signal. The transmitter 200 comprises a detector 270 arranged to convert the drained portion of the optical composite signal to an electrical signal. The transmitter 200 comprises an amplitude controller 260 arranged to adapt the amplitude of the control and protection signal based on the drained portion of the composite signal.

Figure 3:
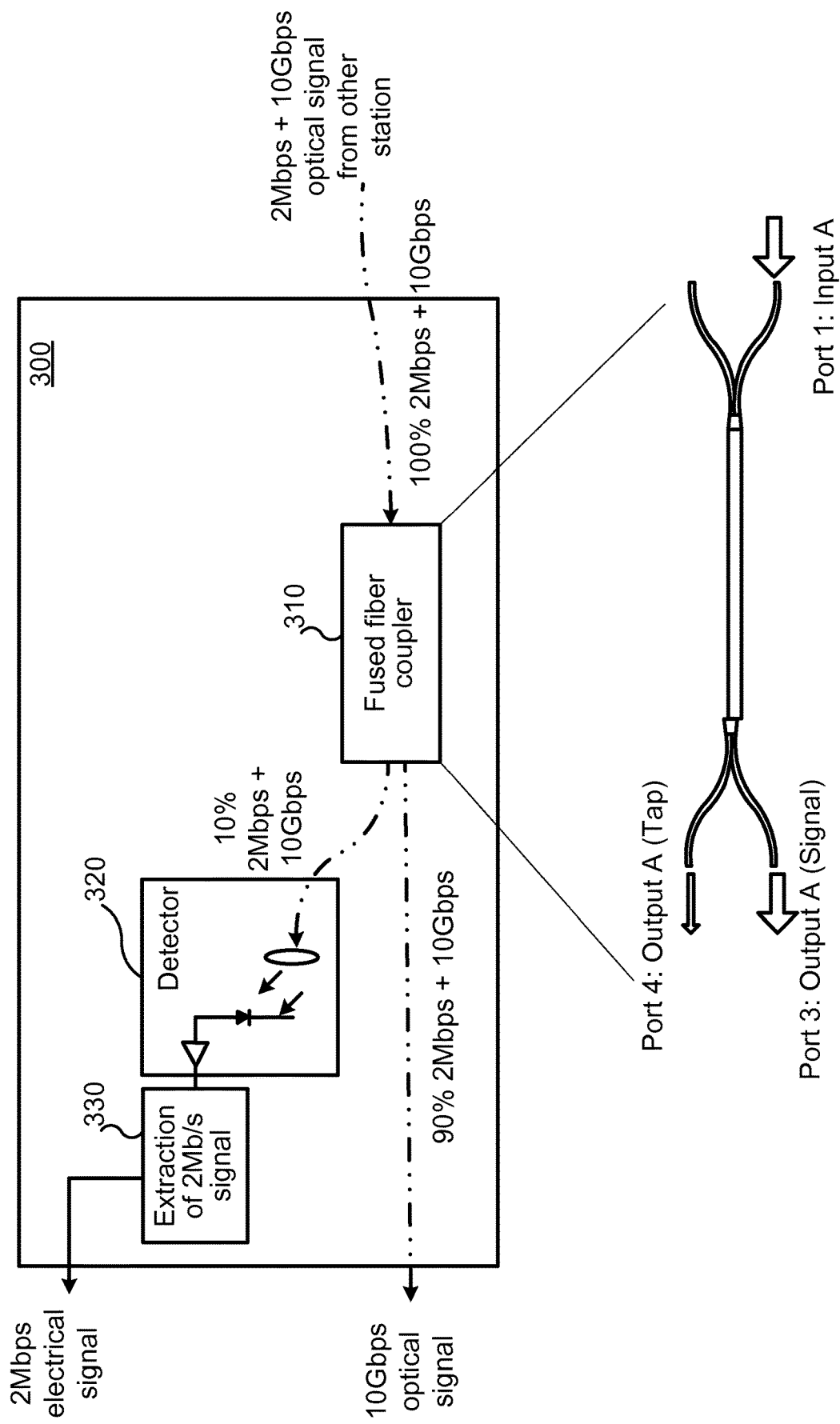
FIG. 3 schematically illustrates the receiver part of a station according to an embodiment.

Reference is now made to FIG. 3. FIG. 3 schematically illustrates the receiver 300 of the communications network 100 for utility communications. It can be assumed that the optical signal received from another station is a composite optical signal having been generated as described with reference to FIG. 2. The receiver 300 comprises a fused fiber coupler 310 arranged to receive the composite optical signal from another station. The fused fiber coupler 310 utilizes three ports, denoted Port 1, Port 3, and Port 4. In this example Port 1 is an input port, and Port 3 and Port 4 are output ports. One of the output ports are used to drain a portion of the received composite signal. The receiver 300 comprises a detector 320 arranged to convert the drained portion into an electrical signal. In more detail, assume that the control and protection signal is 10% of the amplitude of the existing optical signal (with a fiber coupler with 90:10 ratio). At the receiver end another 90% is lost in the port connected to the detector 320. This means that the signal level of the superimposed control and protection signal, at the detector 320, is 20 dB lower than the existing optical signal. The bandwidth of the control and protection signal is low so a high sensitivity (e.g. large detector surface avalanche photo diode) and a high gain amplifier can be used in the detector 320. The receiver 300 comprises an extractor 330 arranged to extract the control and protection signal from the drained portion of the composite signal.

Figure 4:
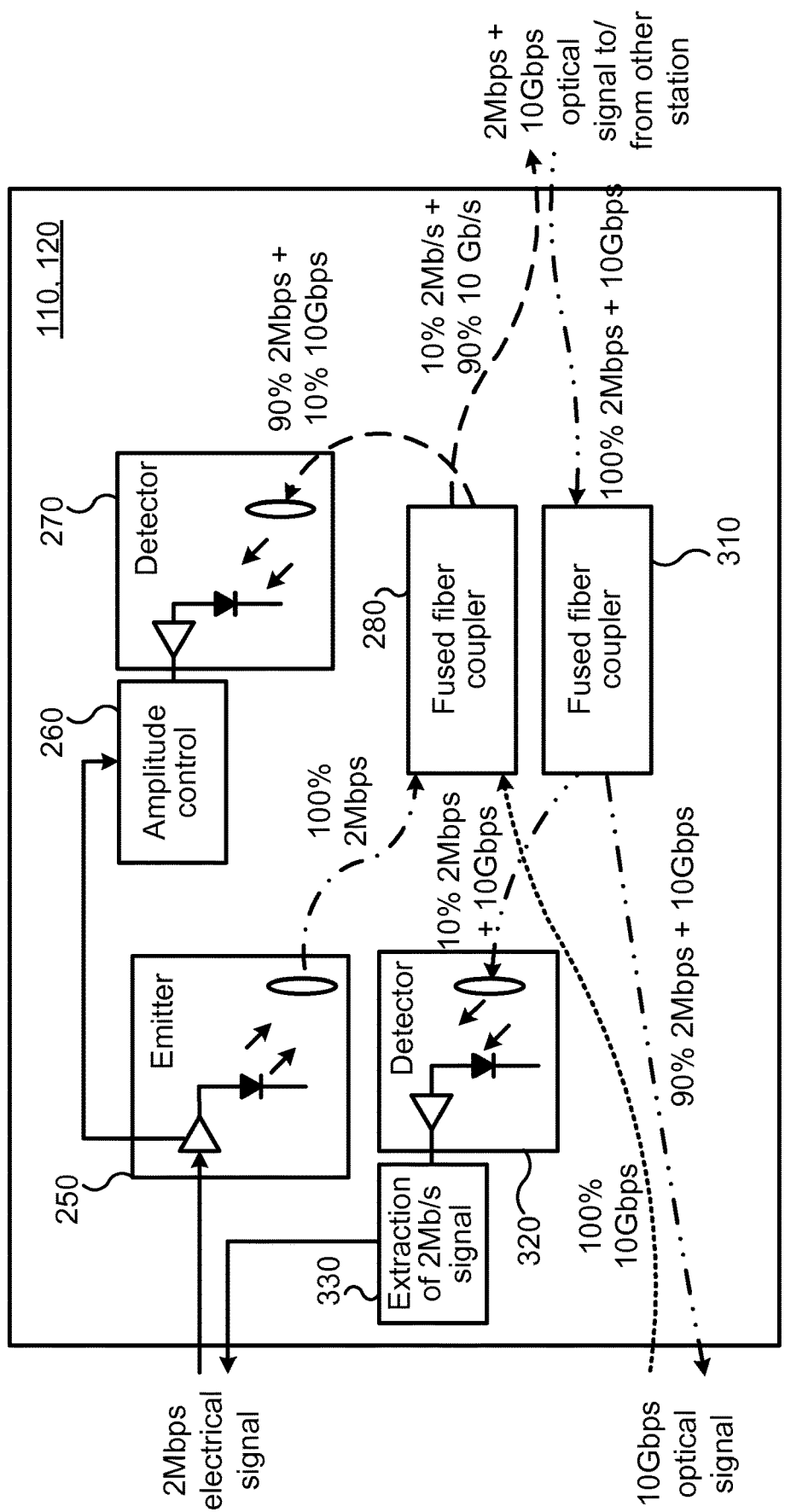
FIG. 4 schematically illustrates the transmitter part and the receiver part of a station according to an embodiment.

Reference is now made to FIG. 4, FIG. 4 schematically illustrates a station 110, 120 in the communications network 100 for utility communications, where the station 110, 120 comprises components of both the transmitter 200 as described above and components of the receiver 300 as described above. Hence, the station 110, 120 comprises an emitter 250 arranged to convert the electrical control and protection signal to an optical control and protection signal. The station 110, 120 comprises a fused fiber coupler 280 arranged to superimpose the optical control and protection signal on the existing optical signal to form a composite optical signal to be transmitted to another station. The station 110, 120 comprises a detector 270 arranged to convert a drained portion of the optical composite signal to an electrical signal. The station 110, 120 comprises an amplitude controller 260 arranged to adapt the amplitude of the superimposed control and protection signal based on the drained portion of the composite signal. The station 110, 120 further comprises a fused fiber coupler 310 arranged to receive a composite optical signal from another station. The station 110, 120 comprises a detector 320 arranged to convert the drained portion into an electrical signal. The station 110, 120 comprises an extractor 330 arranged to extract the control and protection signal from the drained portion.

Figure 5:
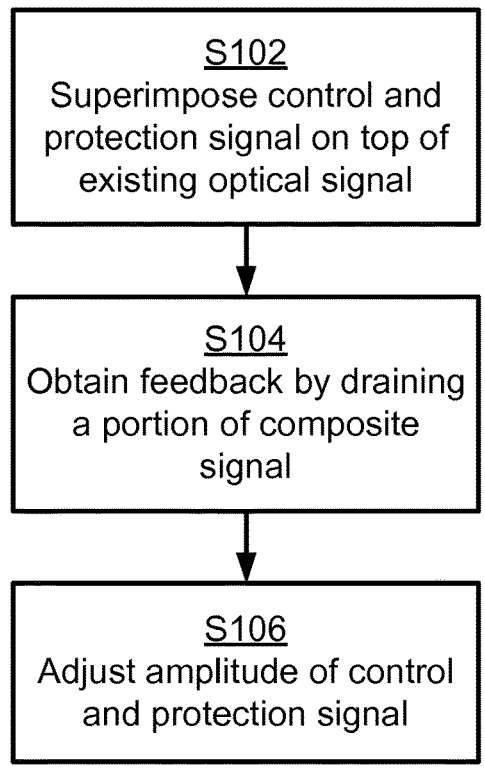
FIG. 5 is a flowchart of a method according to an embodiment.

The embodiments disclosed herein are based on the transmitter 200 superimposing a control and protection signal (FIGS. 2-4: signals with solid lines for electrical signals and dash-dotted for optical signals) on top of an existing optical signal (FIGS. 2-43: signals with dotted lines) transmitted over an optical fiber. A small part of the composite signal (FIGS. 2-4: signals with dashed lines and dash-dot-dotted lines) comprising the existing optical signal and the superimposed control and protection signal is drained to a feedback loop for adjustment of the amplitude of the superimposed control and protection signal. A method disclosing steps corresponding to these operations will now be described with reference to FIG. 5. FIG. 5 is a flow chart illustrating an embodiment of a method for utility communications. The method is performed by the transmitter 200. The method is advantageously provided as a computer program 320.

S102: The transmitter 200 superimposes a control and protection signal for utility communications on top of an existing optical signal to form a composite signal. The existing optical signal is transmitted over an optical fiber. The control and protection signal has lower bit rate than the existing optical signal.

S104: The transmitter 200 obtains feedback by draining a portion of the composite signal from the optical fiber.

S106: The transmitter 200 adjusts amplitude of the control and protection signal according to the drained portion of the composite signal.

Embodiments relating to further details of utility communications as performed by the transmitter 200 will now be disclosed.

In general terms, the composite signal is transmitted from the transmitter 200 to the receiver 300. The transmitter 200 may be part of a transmitting station in the communications network 100. The receiver 300 may be part of a receiving station in the communications network 100. Hence, according to an embodiment, the composite signal is transmitted between a transmitting station 110 and a receiving station 120 in a power system. According to an embodiment, the transmitter 200 is part of the transmitting station 110 and the receiver is part of the receiving station 120.

There may be different ways to adjust the amplitude of the control and protection. For example, in order not to affect the existing optical signal, the superimposed control and protection signal should not be higher in amplitude than e.g. 10% of the Optical Modulation Amplitude of the existing optical signal. The amplitude of the existing optical signal can vary (such as in the order of several dBs according to a small form-factor pluggable (SFP) transceiver specification) and the amplitude of the control and protection signal is hence to be adapted, as in step S106. As an example, a fused fiber coupler has a tap port which can be used as feedback to control the amplitude of the superimposed control and protection signal in step S106. The signal from the tap port could be passed through a low-pass filter and from this signal the amplitude of the existing optical signal as well as the superimposed control and protection signal can be extracted and then used to control the amplitude of the control and protection signal to a suitable level. According to an embodiment the amplitude of the control and protection signal is thus adjusted with respect to reception of the composite signal. The composite signal is intended to be received by the receiver 300. In this respect, the amplitude of the control and protection could be adjusted such that it is below an upper threshold of the receiver 300 of the existing optical signal. Further, the amplitude of the control and protection could be adjusted such that it is above a lower threshold of the receiver 300 of the control and protection signal.

Figure 6:
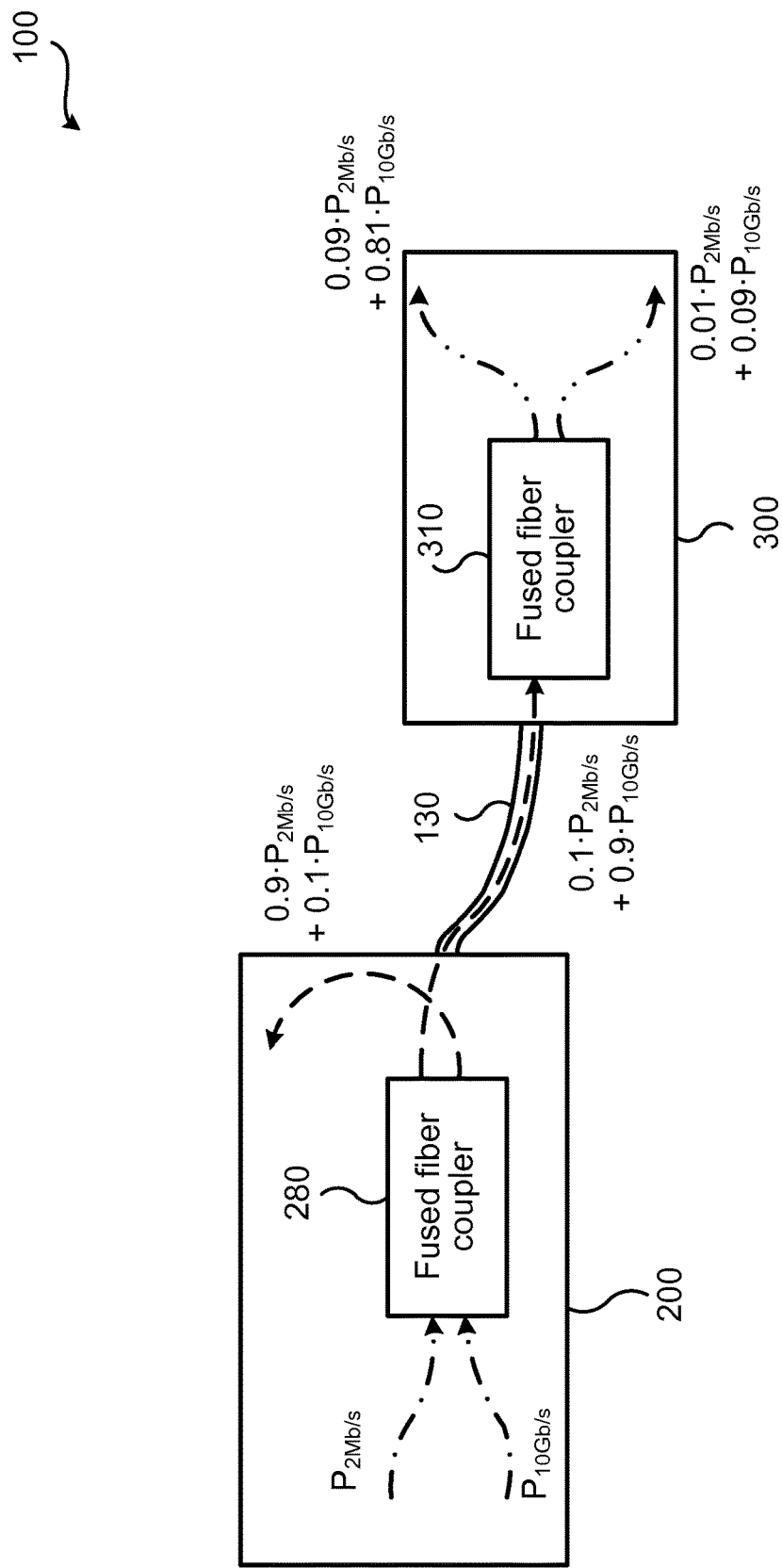

There may be different ways to determine how large portion of the composite signal to be drained. For example, in order to preserve as much as possible of the existing optical signal, a fused fiber optic coupler and splitter with e.g., a 90:10 coupling/split ratio could be used. This means that 10% signal power is lost in the outgoing fiber and another 10% signal power is lost from the incoming fiber, resulting in a total loss of 0.9 dB (i.e., with 81% signal power of the existing optical signal being preserved at the receiver 300 of the of the composite signal). According to an embodiment, the drained portion (at the transmitter 200) thus corresponds to 10% in terms of power of the composite signal (at the transmitter 200). This is illustrated in FIG. 6 where the relative power levels and contributions from the existing optical signal and the control and protection signal are indicated next to each signal. The power contribution of the existing optical signal is denoted P10 Gb/s, and the power contribution of the control and protection signal is denoted P2 Mb/s. That is, x·P2 Mb/s+y·P10 Gb/s indicates a relative power contribution of x·100% from the control and protection signal and a relative power contribution of y·100% from the existing optical signal.

Figure 7:
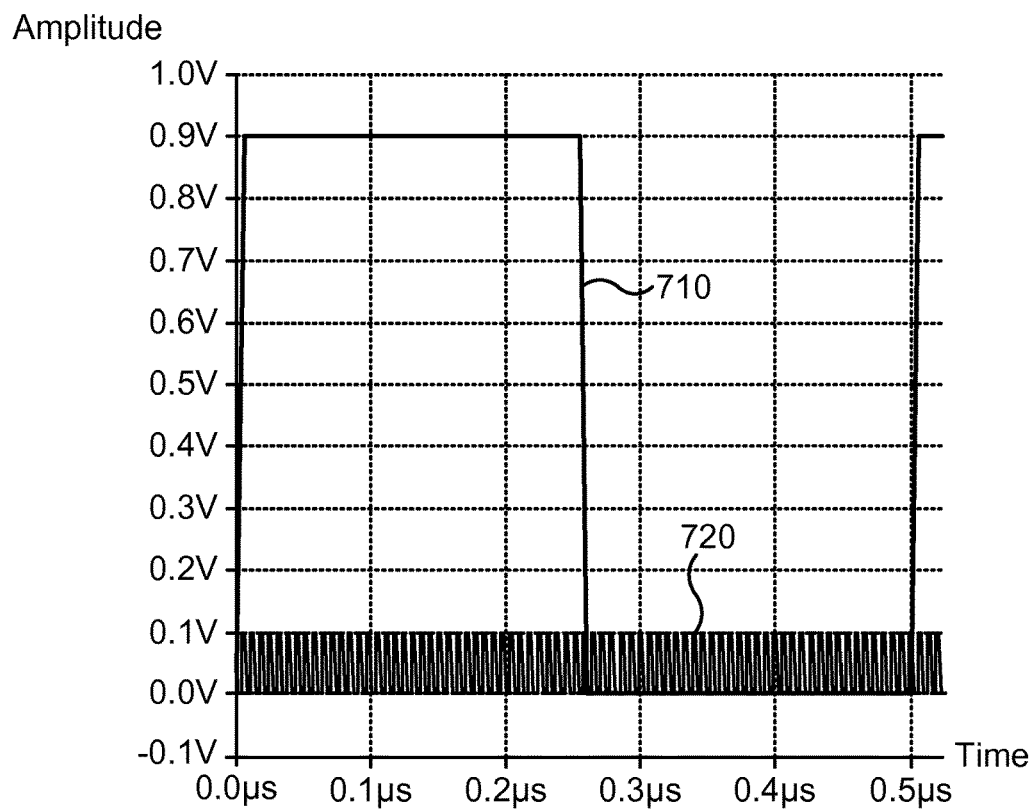
FIGS. 7 and 8 are schematic illustrations of signal levels according to embodiments.
Figure 8:
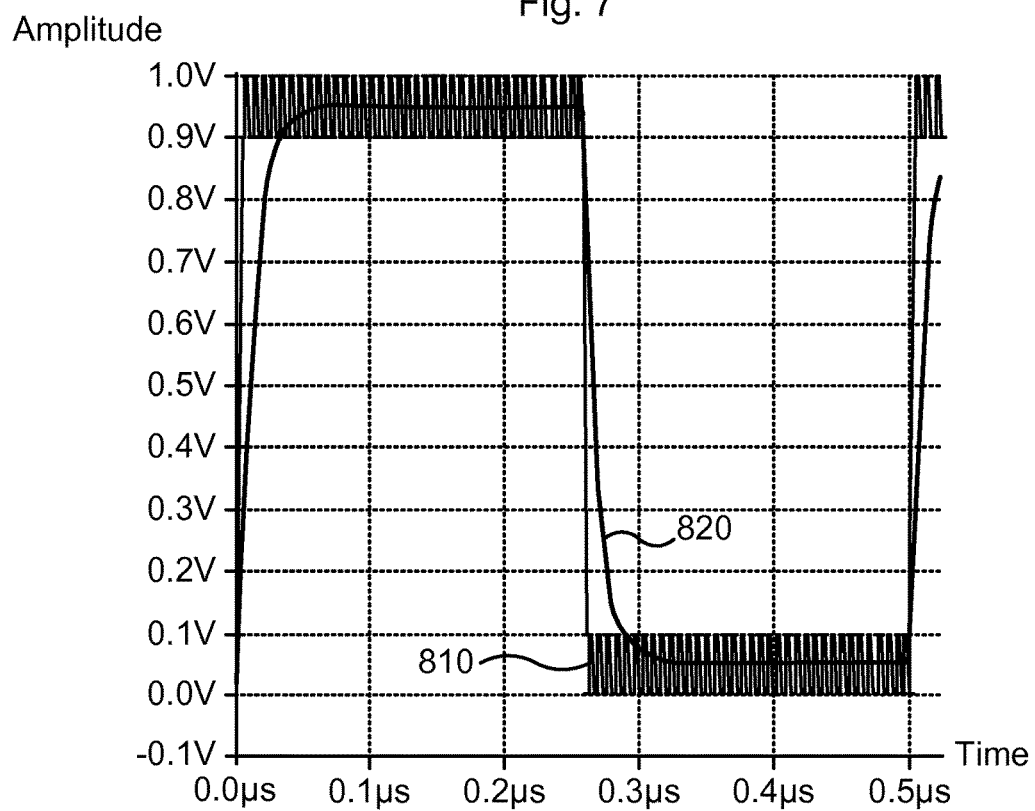

FIGS. 7 and 8 are schematic illustrations of signal levels according to embodiments. FIG. 7 illustrates the separated signal level amplitudes of the control and protection signal 710 drained to the feedback and the existing optical signal 720. In this example a fused fiber coupler with a ratio of 90:10 is used and the input signals (i.e., the control and protection signal and the existing optical signal) are equally strong. Note that the signal levels are only relative and not absolute.

FIG. 8 illustrates the drained composite signal 810 used for amplitude control of the control and protection signal. The drained composite signal 810 is filtered with a low-pass filter and the minimum and maximum level of the thus filtered signal 820 is measured. As can be seen the minimum level is equal to half the level the drained composite signal 810, which with a 90:10 fiber coupler then corresponds to a total of ½₀ of the original input power of the existing optical.

There may be different ways to determine the bit rate of the control and protection signal and the bit rate of the existing optical signal. According to an embodiment, the bit rate of the control and protection signal is at least one order of magnitude lower than the bit rate of the existing optical signal. As an example, the bit rate of the control and protection signal could be lower than 5 Gb/s, such as between 1.5 Mb/s and 2.5 Mb/s, preferably around 2 Mb/s. As an example, the bit rate of the existing optical signal could be higher than 5 Gb/s, such as between 5 Gb/s and 15 Gb/s, preferably around 10 Gb/s. According to some embodiments, pre-requisites for the utility communications are used for determining the bandwidths of the control and protection signal and the existing optical signal.

There may be different kinds of existing optical signals. According to an embodiment, the existing optical signal is a telecommunications service signal.

Figure 9:
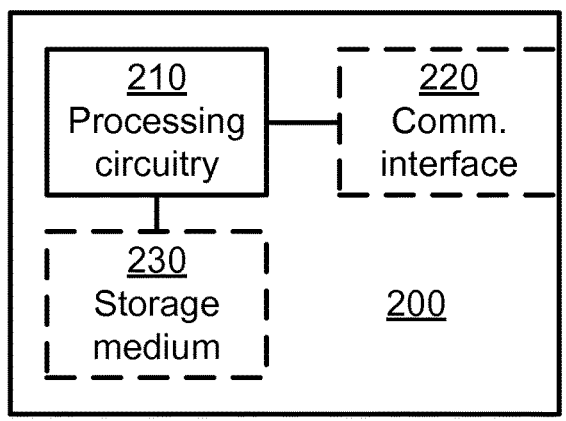
FIG. 9 is a schematic diagram showing functional units of a transmitter according to an embodiment.

FIG. 9 schematically illustrates, in terms of a number of functional units, the components of a transmitter 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 310 (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the transmitter 200 to perform a set of operations, or steps, S102-S106, as disclosed above. For example, the storage medium 230 may store the set of operations, and the processing circuitry 210 may be configured to retrieve the set of operations from the storage medium 230 to cause the transmitter 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The transmitter 200 may further comprise a communications interface 220 at least configured for communications with other entities and devices in the communications system 100, 100a, 100b. As such the communications interface 220 may comprise one or more transmitters and receivers, comprising analogue and digital components. The processing circuitry 210 controls the general operation of the transmitter 200 e.g. by sending data and control signals to the communications interface 220 and the storage medium 230, by receiving data and reports from the communications interface 220, and by retrieving data and instructions from the storage medium 230. Other components, as well as the related functionality, of the transmitter 200 are omitted in order not to obscure the concepts presented herein.

Figure 10:
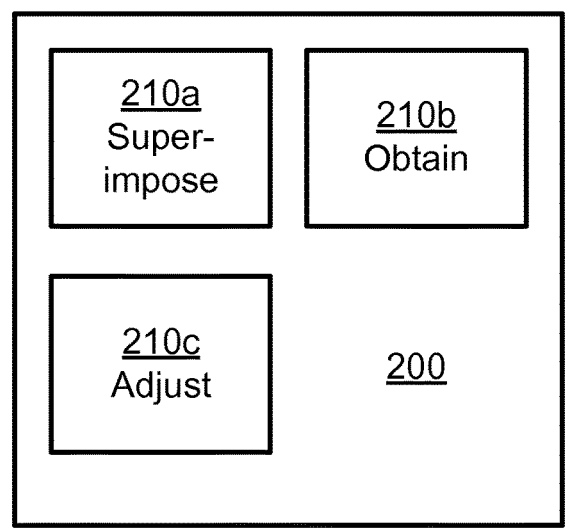
FIG. 10 is a schematic diagram showing functional modules of a transmitter according to an embodiment.

FIG. 10 schematically illustrates, in terms of a number of functional modules, the components of a transmitter 200 according to an embodiment. The transmitter 200 of FIG. 10 comprises a number of functional modules; a superimpose module 210a configured to perform step S102, an obtain module 210b configured to perform step S104, and an adjust module 210c configured to perform step S106. The transmitter 200 of FIG. 10 may further comprises a number of optional functional modules. In general terms, each functional module 210a-210c may in one embodiment be implemented only in hardware or and in another embodiment with the help of software, i.e., the latter embodiment having computer program instructions stored on the storage medium 230 which when run on the processing circuitry makes the transmitter 200 perform the corresponding steps mentioned above in conjunction with FIG. 6. It should also be mentioned that even though the modules correspond to parts of a computer program, they do not need to be separate modules therein, but the way in which they are implemented in software is dependent on the programming language used. Preferably, one or more or all functional modules 210a-210c may be implemented by the processing circuitry 210, possibly in cooperation with functional units 220 and/or 230. The processing circuitry 210 may thus be configured to from the storage medium 230 fetch instructions as provided by a functional module 210a-210c and to execute these instructions, thereby performing any steps as disclosed herein.

Figure 11:
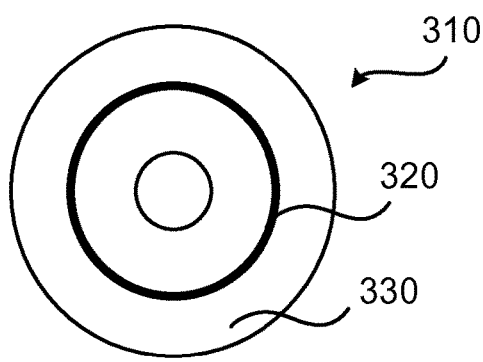
FIG. 11 shows one example of a computer program product comprising computer readable storage medium according to an embodiment.

FIG. 11 shows one example of a computer program product 310 comprising computer readable storage medium 330. On this computer readable storage medium 330, a computer program 320 can be stored, which computer program 320 can cause the processing circuitry 210 and thereto operatively coupled entities and devices, such as the communications interface 220 and the storage medium 230, to execute methods according to embodiments described herein. The computer program 320 and/or computer program product 310 may thus provide means for performing any steps as herein disclosed.

In the example of FIG. 11, the computer program product 310 is illustrated as an optical disc, such as a CD (compact disc) or a DVD (digital versatile disc) or a Blu-Ray disc. The computer program product 310 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 320 is here schematically shown as a track on the depicted optical disk, the computer program 320 can be stored in any way which is suitable for the computer program product 310.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for utility communications, the method being performed by a transmitter, the method comprising:
  superimposing a control and protection signal for utility communications on top of an existing optical signal transmitted over an optical fiber to form a composite signal, wherein the control and protection signal has lower bit rate than the existing optical signal, and wherein the utility communications relate to remote control of unmanned stations and transfer of data and load values;
  obtaining feedback by draining a portion of the composite signal from the optical fiber; and
  adjusting amplitude of the control and protection signal according to said portion of the composite signal.

2. The method according to claim 1, wherein the amplitude of the control and protection is adjusted with respect to reception of the composite signal.

3. The method according to claim 1, wherein the amplitude of the control and protection is adjusted such that it is below an upper threshold of a receiver of the existing optical signal.

4. The method according to claim 1, wherein the amplitude of the control and protection is adjusted such that it is above a lower threshold of a receiver of the control and protection signal.

5. The method according to claim 4, wherein the receiver is part of the receiving station.

6. The method according to claim 1, wherein the composite signal is transmitted between a transmitting station and a receiving station in a power system.

7. The method according to claim 6, wherein the transmitter is part of the transmitting station.

8. The method according to claim 7, wherein the receiver is part of the receiving station.

9. The method according to claim 6, wherein the receiver is part of the receiving station.

10. The method according to claim 1, wherein the portion corresponds to 10% in terms of power of the composite signal.

11. The method according to claim 1, wherein the bit rate of the control and protection signal is at least one order of magnitude lower than the bit rate of the existing optical signal.

12. The method according to claim 1, wherein the bit rate of the control and protection signal is 2 Mb/s.

13. The method according to claim 1, wherein the bit rate of the existing optical signal is 10 Gb/s.

14. The method according to claim 1, wherein the existing optical signal is a telecommunications service signal.

15. A transmitter for utility communications, the transmitter comprising processing circuitry, the processing circuitry being configured to cause the transmitter to:
   superimpose a control and protection signal for utility communications on top of an existing optical signal transmitted over an optical fiber to form a composite signal, wherein the control and protection signal has lower bit rate than the existing optical signal, and wherein the utility communications relate to remote control of unmanned stations and transfer of data and load values;
   obtain feedback by draining a portion of the composite signal from the optical fiber; and
   adjust amplitude of the control and protection signal according to said portion of the composite signal.

16. A transmitter for utility communications, the transmitter comprising:
   a superimpose module configured to superimpose a control and protection signal for utility communications on top of an existing optical signal transmitted over an optical fiber to form a composite signal, wherein the control and protection signal has lower bit rate than the existing optical signal, and wherein the utility communications relate to remote control of unmanned stations and transfer of data and load values;
   an obtain module configured to obtain feedback by draining a portion of the composite signal from the optical fiber; and
   an adjust module configured to adjust amplitude of the control and protection signal according to said portion of the composite signal.

17. A non-transitory computer-readable medium storing a computer program for utility communications, the computer program comprising computer code which, when run on processing circuitry of a transmitter, causes the transmitter to:
   superimpose a control and protection signal for utility communications on top of an existing optical signal transmitted over an optical fiber to form a composite signal, wherein the control and protection signal has lower bit rate than the existing optical signal, and wherein the utility communications relate to remote control of unmanned stations and transfer of data and load values;
   obtain feedback by draining a portion of the composite signal from the optical fiber; and
   adjust amplitude of the control and protection signal according to said portion of the composite signal.

* * * * *